United States Patent Office 3,773,889
Patented Nov. 20, 1973

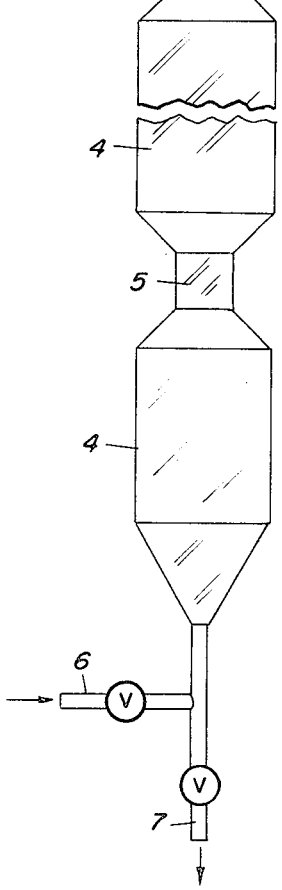
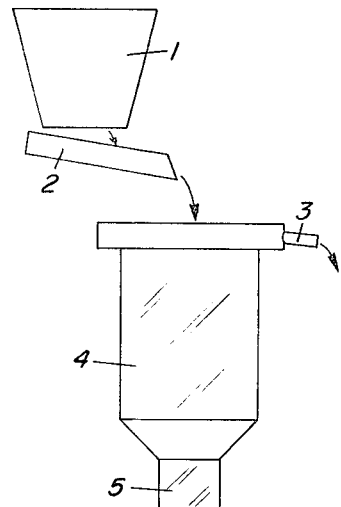
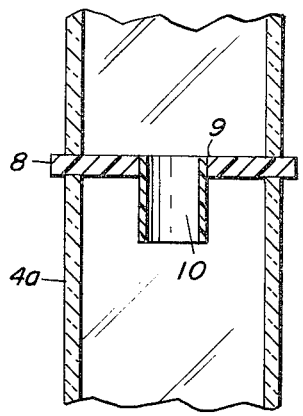
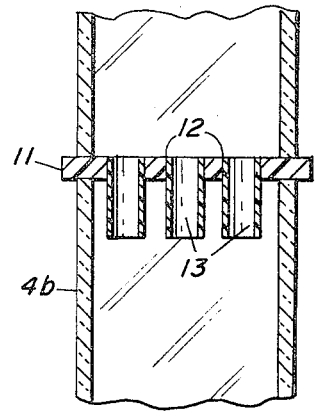
FIG.2   FIG.3
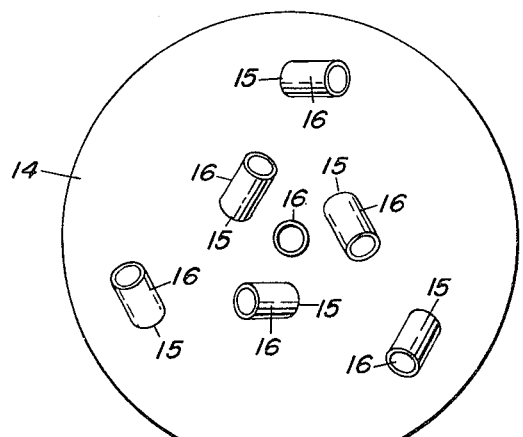
FIG.4
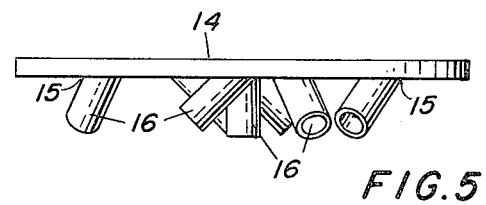
FIG.5
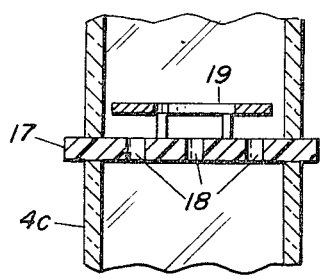
FIG.6

3,773,889
ION EXCHANGE PROCESS
D'Arcy R. George and J. Richard Ross, Salt Lake City, Utah, assignors to the United States of America as represented by the Secretary of the Interior
Continuation-in-part of abandoned application Ser. No. 783,663, Dec. 13, 1968. This application June 30, 1971, Ser. No. 158,306
Int. Cl. C02b 1/42
U.S. Cl. 423—6        4 Claims

ABSTRACT OF THE DISCLOSURE

A method for recovering metals from a solution or slurry comprising countercurrently contacting the solution or slurry with an ion exchange resin column operating on the solution upflow principle. The ion exchange resin column is characterized by subdivision into a series of multiple vertical sections each separated from the other by a zone of reduced diameter. The method of the invention is particularly effective for recovering uranium from solutions of low uranium content.

---

This application is a continuation-in-part of application Ser. No. 783,663, filed Dec. 13, 1968, now abandoned.

Many processes have been developed for recovering metal values from solutions or slurries by ion exchange. However, costs are often excessive, particularly for the recovery of small concentrations of metals from very large volumes of solutions. This is particularly true with reference to the capital costs of existing types of equipment and resin requirements needed to assure high recovery efficiency. Therefore, a more efficient method is needed for contacting a dilute metal-bearing solution with ion exchange resins.

It has now been found, according to the process of the invention, that this improved efficiency can be obtained by countercurrently contacting a solution or slurry containing dissolved metal values with an ion exchange resin in the form of a column which operates on the solution upflow principle, and in which turbulence and axial mixing of the resin in the column at high solution flow rates is restricted, thereby improving sorption efficiency.

The novel feature of the ion exchange resin column of the invention is the subdivision of the column into a series of multiple vertical sections, each separated from the other by a zone of reduced diameter. The purpose of this reduction in diameter is to achieve a localized increase in the velocity of the upflowing solution so that the solution velocity is in excess of the settling velocity of the resin particles in the restricted zones but not in the unrestricted sections. As a result, mixing of resin can occur within each section but not between sections. This improves sorption efficiency and thereby reduces resin and equipment requirements.

Operation of the column is semicontinuous. At intervals, depending upon the solution flow rate and content of sorbable ions, the solution flow is interrupted and exhausted or loaded resin is withdrawn by gravity from the bottom section of the column. During this same interval, equivalent volumes of partly loaded resin descend from one section to the next and the top section is charged with fresh or regenerated resin. The flow of solution then is resumed until the cycle is repeated.

By use of mechanically activated valves and feeders, and electronic controls, the column operation can be fully automated but the manner in which such automation is accomplished does not constitute a part of this invention.

Optimum flow rate of the feed solution, i.e., the rate that is sufficient to fluidize the resin charge and maintain the desired separation of resin particles in the separate sections of the column, without overflow of resin from the top of the column, will vary widely and is best determined experimentally. Factors influencing the optimum flow rate include size, i.e., length and diameter of the column; the specific design of the column, particularly that of the restricted zones; nature of the feed solution; type and size of resin employed; etc. For the preferred embodiment of the invention, described in the example below, a flow rate of about 5 to 25 gallons per square foot per minute has been found to be satisfactory.

The type of ion exchange resin employed will obviously depend on the metal which is to be removed from solution. For removal of uranium, for which the process of the invention has been found to be particularly effective, strong base anion exchange resins, of the coarse bead type (16 x 20 mesh) such as Amberlite IRA-425 and Dowex 21K are preferred. These ion exchange resins are conventional and do not constitute a part of the invention.

Product uranium may be readily recovered from the loaded resin that results from the process of the invention by conventional means such as elution with an approximately 1 molar solution of chloride, nitrate or sulfuric acid.

FIGS. 1–6 illustrate alternative embodiments of apparatus that can be used in the process of the invention. The invention is, however, not limited to these particular embodiments, since any apparatus capable of providing the required vertical sections and restricted zones can be used.

FIG. 1 is an elevation view of an apparatus suitable for use in the process of the invention, in which the zone of reduced diameter is achieved simply by a reduction of the diameter of the column. In this apparatus the resin is supplied by means of hopper 1 and feeder 2 to the top of the column. The apparatus is composed of a series of sections 4 separated by restricted zones 5. Feed solution is introduced at inlet 6 and the barren solution, following resin contacting, is removed at outlet 3. Spent resin is removed from the column by means of outlet 7. Restricted zones 5 result in localized increases in the velocity of the upflowing feed solution so that the solution velocity is in excess of the settling velocity of the resin particles in these zones. As a result the resin charge is effectively separated into multiple sections, thereby improving sorption efficiency. A similar improvement in efficiency could be achieved by the use of a series of smaller columns connected in series, but such an arrangement would substantially increase equipment costs and would make countercurrent operations difficult.

FIG. 2 is a fragmentary sectional view of an alternative type of apparatus that can be used in the process of the invention. In this apparatus, the sections illustrated by section 4a in the figure, are separated by means of orifice plate 8 having hole 9 extending therethrough. Hole 9 is fitted with tubular member 10, the upper surface of which is substantially flush with the top of plate 8 and the body of which extends into the interior of section 4a. This combination of orifice plate and tubular member provide the required restricted zone corresponding to zones 5 in FIG. 1.

FIG. 3 is a fragmentary sectional view of a further alternative type of apparatus. In this embodiment the sections, illustrated by section 4b, are separated by means of an orifice plate 11 having a plurality of holes 12 extending therethrough. Each hole is fitted with a tubular member 13, similar to those in the embodiment of FIG. 2.

FIGS. 4 and 5 illustrate a further alternative type of apparatus. This embodiment is similar to that of FIG. 3 except that a plurality of the holes and tubular members in the orifice plate are inclined at an angle. FIG. 4 is a plan view of the orifice plate 14 with holes 15 and tubular members 16. FIG. 5 is a side elevation view of the same structure from the underside of the orifice plate. This arrangement imparts a swirling action to the resin just above the orifice, thus eliminating dead resin areas and further improving the efficiency of the column. The optimum angle of the tubular members will vary widely depending on the size of the column, type and size of resin, flow rate of solution and resin, etc. Generally, however, an angle of between about 30° and 60° gives satisfactory results.

FIG. 6 is a fragmentary sectional view of a still further alternative type of apparatus. In this embodiment the sections, illustrated by section 4c, are again separated by means of orifice plate 17 having a plurality of holes 18 extending therethrough. This embodiment, however, does not employ the tubular members of the embodiments of FIGS. 2 to 5. Instead, one or more baffles, preferably circular in shape, as illustrated by reference 19 in FIG. 6, are positioned a short distance above the holes in the orifice plate to deflect the upward flow of solution or slurry laterally so as to eliminate dead resin areas.

The materials of construction used in the apparatus may of course vary widely, provided only that they are compatible with the solution and resin and are suitable for providing the required structural characteristics.

The following examples will serve to more particularly describe the process of the invention.

EXAMPLE 1

In this example the apparatus employed contained reduced diameter zones of the type illustrated in FIGS. 4 and 5.

The apparatus was constructed of 14 gage, 304 stainless steel, had a 14 inch diameter and was approximately 36 feet high. It was comprised of eight 4-foot flanged sections plus a short conical bottom section, and a 24 inch diameter top section fitted with a peripheral overflow launder. Each of the sections had a sampling port at midpoint to permit withdrawal of solution and resin samples. Feed solution was introduced into a cone at the base of the column at a rate which fully fluidized the resin charge, and the depleted solution overflowed the launder at the top, but not in sufficient velocity to cause the resin to overflow.

Orifice plates were positioned between each of the flanged sections. These were constructed of one inch thick clear plastic drilled with seven 1.5 inch diameter holes and located as shown in FIGS. 4 and 5. The orifice plates were drilled with six 1.5 inch diameter holes at a 45° angle and a vertical centerhole. They were spaced at 120° intervals on circles with radii of three and six inches. A 1.25 inch ID rigid plastic tube of 4.5 inch length was cemented in each hole so that the tops of the tubes were flush with the upper surface of the plate. The six inclined tubes served to impart a swirling action to the resin just above the orifice plate and eliminate dead resin areas. There was no mixing of the resin between sections while solution was flowing up the column.

The column operated with a continuous flow of solution except for a brief interruption at regular intervals during which the solution inlet valve was closed for 15 to 30 seconds. A volume of loaded resin containing an amount of uranium equivalent to that absorbed during the contact period was rapidly withdrawn from the bottom section by opening the resin outlet valve. At the same time equivalent volumes of resin moved rapidly down the column through the orifice holes, and from each section into the next below. The resin outlet valve was then closed, the solution flow resumed and a charge of fresh resin, equivalent in volume to the amount withdrawn, was introduced into the top section. This relatively simple operation lent itself to completely automatic operation which could be easily and inexpensively installed. The resin employed was "Amberlite IRA–425," a strong base anion exchange resin of the quaternary ammonium type. The resin was of the coarse bead variety, minus 16-plus 20 mesh, conventionally used in resin-in-pulp type uranium milling circuits.

Feed solution for the test was the effluent from a copper cementation launder at a large copper mine, having a pH of 3.4 to 3.5, a temperature of 90° F. and a density of about 1.09. Feed solution available during the test decreased in $U_3O_8$ control from 12 p.p.m. at the start to 7.5 p.p.m. at the end because of operational difficulties in the copper cementation launders. It was pumped from a sump in the launder system to a 700 gallon settling tank to remove trash and occasional heavy concentrations of cement copper, and overflowed into a second 700 gallon storage tank from which it was pumped to the column through a flow meter. Effluent from the column overflowed at the top to a resin catch tank and then joined the effluent from the cementation plant.

The absorption column was operated for three weeks at a flow of 10 g.p.m., for one week at 15 g.p.m. and for a final two weeks at 20 g.p.m. These flows are essentially equivalent to flows expressed as g.p.m. per square foot as the column area was 1.02 square feet. The total volume of solution processed was 473,000 gallons containing 38.05 pounds of $U_3O_8$, with a weighted average assay of 9.7 p.p.m. $U_3O_8$. Resin withdrawals were made at four hour intervals. The effluent from the column was assayed every 2 hours and whenever resin was withdrawn from the column the $U_3O_8$ loading was determined by stripping a measured volume of resin. Results are shown in Table 1.

TABLE 1

| | | | Resin | | | |
|---|---|---|---|---|---|---|
| Solution flow, gal./ft.²/min. | Feed assay, $U_3O_8$, p.p.m. | Tails assay, $U_3O_8$, p.p.m. | Inventory, cu. ft. | Withdrawal, cu. ft. per 4 hrs. | Loading, $U_3O_8$, lb. per cu. ft. | Recovery $U_3O_8$, percent |
| 10 | 12 | 1.8 | 20 | 0.32 | 0.63 | 85 |
| 15 | 10.5 | 2.2 | 15 | 0.45 | 0.56 | 79 |
| 20 | 7.5 | 2.5 | 10.6 | 0.40 | 0.49 | 67 |

EXAMPLE 2

In this example the apparatus was similar to that of Example 1, except that the orifice plates were of the type illustrated in FIG. 6. In addition, only five sections were employed and the solution inlet and resin outlet valves were automated. In this test the feed solution was a slightly alkaline natural water pumped from a uranium mine. The average $U_3O_8$ assay was 8.9 p.p.m. The resin used was Dowex 21K, a 16 by 20 mesh strong base quaternary ammonium type anion exchange resin. Resin withdrawals and additions were made at 8-hour intervals. Results of the test which covered a period of approximately 5 months are shown in Table 2.

TABLE 2

| | | | Resin | | | |
|---|---|---|---|---|---|---|
| Solution flow, gal./ft.²/min. | Feed assay, $U_3O_8$, p.p.m. | Tails assay, $U_3O_8$, p.p.m. | Inventory, ft.³ | Withdrawal, ft.³/8 hrs. | Loading, $U_3O_8$, lb./ft.³ | $U_3O_8$ recovery, percent |
| 20 | 8.9 | <0.1 | 8 | 0.20 | 3.6 | 99 |
| 25 | 8.9 | .17 | 6 | .33 | 2.7 | 98 |

We claim:

1. A process for recovering uranium from a solution or slurry comprising passing an essentially constant-rate flow of the solution or slurry in an upward direction through an ion exchange resin column, said column being subdivided into a series of vertical sections that are separated by zones of reduced diameter relative to that of said sections, the flow rate of the solution or slurry being sufficient to provide a velocity of upflowing solution or slurry in the zones of reduced diameter that is greater than the settling velocity of the resin in the zones of reduced diameter and fluidization and mixing of resin particles in the vertical sections but not in the zones of reduced diameter.

2. The process of claim 1 in which the zones of reduced diameter are formed by orifice plates between the vertical sections, said orifice plates having one or more holes therethrough and having tubular members fitted to said holes and substantially flush with the surface of said orifice plate.

3. The process of claim 2 in which a plurality of the holes in the orifice plate and the tubular members fitted thereto are inclined at an angle to the orifice plate in order to impart a swirling action to the resin particles.

4. The process of claim 1 in which the zones of reduced diameter are formed by orifice plates between the vertical sections, said orifice plates having one or more holes therethrough and having one or more baffles fitted above the holes to deflect the upward flow of solution or slurry in such a manner as to keep substantially all of the resin particles in suspension.

References Cited
UNITED STATES PATENTS

| | | | |
|---|---|---|---|
| 3,549,526 | 12/1970 | Brown | 210—33 |
| 3,423,183 | 1/1969 | Goetzke | 23—310 |
| 2,932,552 | 4/1960 | Weiss et al. | 423—6 |
| 3,551,118 | 12/1970 | Cloete et al. | 210—33 |
| 2,743,159 | 4/1956 | Lutz | 423—6 |
| 3,240,699 | 3/1966 | Duff et al. | 210—38 |
| 2,992,249 | 7/1961 | Boyd et al. | 423—7 |
| 2,707,152 | 4/1955 | Chaney et al. | 210—38 |

CARL D. QUARFORTH, Primary Examiner

F. M. GITTES, Assistant Examiner

U.S. Cl. X.R.

23—310, 312 ME; 423—7